(12) United States Patent
Sauder et al.

(10) Patent No.: US 9,191,819 B2
(45) Date of Patent: Nov. 17, 2015

(54) SECURITY METHOD FOR THE VERIFICATION OF AN INFORMATION RETRIEVAL REQUEST

(71) Applicant: Vodafone Holding GmbH, Düsseldorf (DE)

(72) Inventors: Oliver Sauder, Duisburg (DE); Lars Nestler, Witten (DE); Simon Sporton, Berkshire (GB)

(73) Assignee: Vodafone Holding GmbH, Düsseldorf (DE)

( * ) Notice: Subject to any disclaimer, the term of this patent is extended or adjusted under 35 U.S.C. 154(b) by 0 days.

(21) Appl. No.: 14/532,945

(22) Filed: Nov. 4, 2014

(65) Prior Publication Data
US 2015/0126156 A1    May 7, 2015

(30) Foreign Application Priority Data

Nov. 6, 2013  (EP) .................................... 13191793

(51) Int. Cl.
*H04M 3/16* (2006.01)
*H04W 12/06* (2009.01)
*H04L 29/06* (2006.01)
*H04W 8/08* (2009.01)
*H04W 12/08* (2009.01)

(52) U.S. Cl.
CPC ............. *H04W 12/06* (2013.01); *H04L 63/101* (2013.01); *H04W 8/08* (2013.01); *H04W 12/08* (2013.01)

(58) Field of Classification Search
CPC ........ H04W 12/06; H04W 8/245; H04W 8/12
USPC ........................................ 455/411, 418, 433
See application file for complete search history.

(56) References Cited

U.S. PATENT DOCUMENTS

| | | | |
|---|---|---|---|
| 6,360,102 B1 | 3/2002 | Havinis | |
| 7,130,630 B1 | 10/2006 | Enzmann | |
| 8,077,708 B2 * | 12/2011 | Maestas et al. | ............... 370/389 |
| 2006/0025131 A1 | 2/2006 | Adamany | |
| 2006/0045124 A1 * | 3/2006 | Dahlstrom et al. | ........... 370/465 |
| 2007/0140145 A1 * | 6/2007 | Kumar et al. | ................. 370/254 |
| 2008/0220740 A1 | 9/2008 | Shatzkamer | |

(Continued)

FOREIGN PATENT DOCUMENTS

GB          2381419 A        4/2003

OTHER PUBLICATIONS

Extended European Search Report, mailing date Mar. 18, 2014, for corresponding European Application No. EP 13191793.2.

*Primary Examiner* — Danh Le
(74) *Attorney, Agent, or Firm* — Intellectual Property Law Group LLP

(57) ABSTRACT

The invention is related to security method for the verification of an Information Retrieval Request (10) which requests a transmission of data (20) from a Location Register Server (LR) to a Sending Entity (30) in a Mobile Communication Network (100), comprising the following steps: receive an Information Retrieval Request (10) from the Sending Entity (20); extract at least one Specification Code (12) for specifying the Sending Entity (20) and/or a Mobile Subscriber (MS) out of the Information Retrieval Request (10); compare the extracted at least one Specification Code (12) to a Verification List (14); based on the result of the comparison with the Verification List (14), allow or prohibit the transmission of data (20) requested in the Information Retrieval Request (10).

20 Claims, 4 Drawing Sheets

(56) References Cited

U.S. PATENT DOCUMENTS

| | | | |
|---|---|---|---|
| 2008/0263159 A1* | 10/2008 | Choi | 709/206 |
| 2009/0305699 A1* | 12/2009 | Deshpande et al. | 455/434 |
| 2010/0105416 A1* | 4/2010 | Nadler et al. | 455/456.4 |
| 2010/0120426 A1* | 5/2010 | Singh et al. | 455/435.1 |
| 2011/0189997 A1* | 8/2011 | Tiwari et al. | 455/443 |
| 2014/0192795 A1* | 7/2014 | Balar et al. | 370/338 |

* cited by examiner

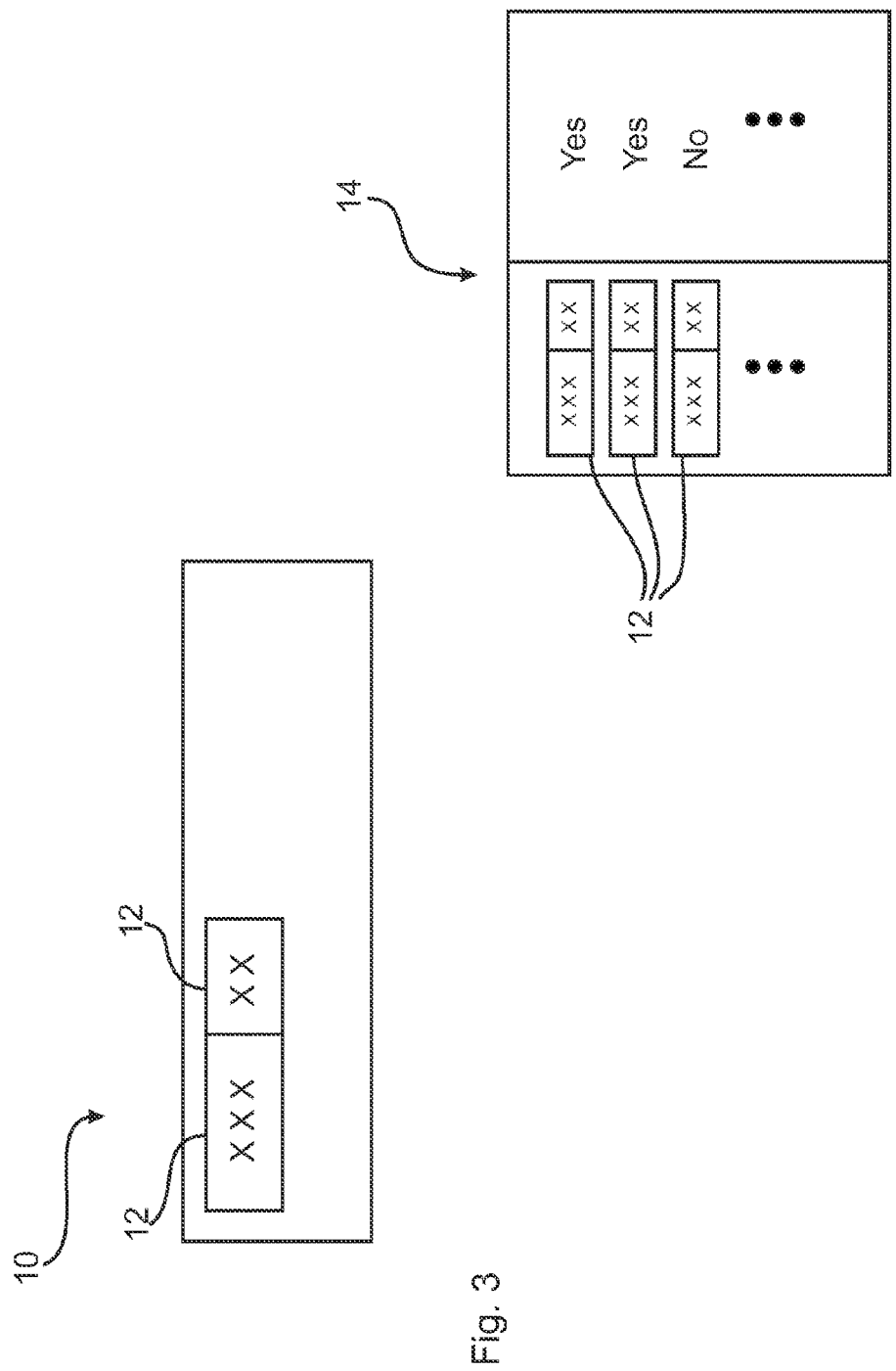

SECURITY METHOD FOR THE VERIFICATION OF AN INFORMATION RETRIEVAL REQUEST

CROSS-REFERENCE TO RELATED APPLICATION

This application claims priority to European patent application no. EP 13 191 793.2 filed on Nov. 6, 2013, which is hereby incorporated by reference for all purposes in its entirety.

BACKGROUND

1. Field of Invention

The present invention is related to a security method for the verification of an Information Retrieval Request, a computer program product being stored in a computer-readable medium to carry out such a security method, a Security Device for the verification of an Information Retrieval Request as well as a Mobile Communication Network comprising such a Security Device.

2. Background Art

It is state of the art that different kinds of protocols are used for communication in a complex Mobile Communication Network. For example, in a Mobile Communication Network different kinds of servers are located. The different kinds of servers can be separated by their use and location. For example, a so-called Visited Location Register Server (VLR) can be used to coordinate several network cells and the respective network antennas and to store information from subscribers that are located in the VLR. Moreover, a so-called Home Location Register Server (HLR) can be used to store general or basic information for the network and in particular with respect to the users of the network, the so-called network subscribers and to store the present address of the VLR and the MSC of the subscriber that is logged in to the Mobile Communication Network. In commonly known Mobile Communication Networks, information about the mobile subscribers has to be passed between the different servers, in particular in circuit switched networks between the VLR and the HLR, or in the case of packet switched networks, between the Serving CPRS Support Node (SGSN) and the HLR. Sometimes the VLR is integrated or stored in the Mobile Switching Center (MSC) and therefore subscriber information is stored in the MSC/VLR or in the Mobile Switching Center Server (MSCS) and therefore in the so-called MSCS/VLR. The SGSN is at the same hierarchical level in the General Packet Radio Service (GPRS) core network as a MSC in a circuit switched core network, e.g. a GSM network. The SGSN contains a register that is called SGSN Location register (SLR), which stores subscriber information similar to the information stored in the VLR in the MSC, i.e. the MSC/VLR pair is comparable to the SGSN/SLR pair. In the following specification an Information Retrieval Request may be directed to any of such kinds of Location Registers. Such a Location Register may be, for example, the VLR, the MSC/VLR, the MSCS/VLR, the SGSN or the SGSN/SLR or any similar equipment in a Mobile Communication Network. The Information Retrieval Request may be performed to retrieve certain subscriber information from the Location Register respectively Location Register Server. Such information can, for example, be basic information stored in the HLR and passed to the Location Register, e.g. the VLR or the SGSN. This leads to a communication in a first direction. The other way round, data which is stored on the Location Register, e.g. the VLR or the SGSN, can also be transmitted to the HLR, for example, to give the HLR notice where the different mobile subscribers are located in the respective cell or in the respective area coordinated by the respective VLR or SGSN. The data stored in the Location Register, e.g. the VLR or the SGSN can, for example, comprise information about the location, the usage or the movement of the mobile subscriber.

It has occurred that by the increase of technical possibilities in the network industry, a security problem can arise with commonly known structures of Mobile Communication Networks. For example, the risk exists that retrieval of data is requested by an outside server which is not an authorized HLR. This means, retrieval of data can be requested, for example, from a frauded HLR which is not part of the Mobile Communication Network that is operated by the Mobile Network Operator to which a certain user is registered or from a frauded HLR which is not located in the same country as a certain user is registered to a Mobile Network Operator. Therefore, in commonly known Mobile Communication Networks such an outside Sending Entity can label itself as a fraud or fake HLR and therefore tries to request secured information located on the respective Location Register, e.g. VLR or SGSN.

SUMMARY OF THE INVENTION

It is an object of the present invention to overcome the disadvantages discussed in the above section. In particular, it is an object of the present invention to provide a solution as to increasing security for crucial data stored on a Location Register, e.g. VLR or SGSN.

The aforesaid problem is solved by a security method with the features of independent claim 1, a computer program product with the features of independent claim 10, a Security Device with the features of independent claim 12 and with a Mobile Communication Network with the features of independent claim 15. Further features and details of the present invention can be derived from the sub-claims, the description and the drawings. Features and details discussed with respect to the security method can of course also be combined with features and details discussed in relation to the computer program product, the Security Device and/or the Mobile Communication Network in the other way round.

One aspect of the present invention is related to a security method for the verification of an Information Retrieval Request which requests a transmission of data from a Location (LR) to a Sending Entity in a Mobile Communication Network. The inventive security method comprises the following steps.

Receive an Information Retrieval Request from the Sending Entity,

Extract at least one Specification Code for specifying the Sending Entity and/or a Mobile Subscriber (MS) out of the Information Retrieval Request, Compare the at least one extracted Specification Code to a Verification List, Based on the result of the comparison with a Verification List, allow or prohibit the transmission of data requested in the Information Retrieval Request.

According to some embodiments of the invention the inventive security method comprises the following steps:

Receive an Information Retrieval Request from the Sending Entity,

Extract at least two Specification Codes for specifying the Sending Entity and a Mobile Subscriber (MS) out of the Information Retrieval Request, Compare the at least two extracted Specification Codes to a Verification List, Based on the result of the comparison with a Verification List, allow or prohibit the transmission of data requested in the Information Retrieval Request.

An inventive security method can be carried out, for example, by a software module in a VLR, MSCS/VLR respectively MSC/VLR, SGSN, SGSN/SLR, a respective Signal Transfer Point (STP). The inventive security method can be understood as a verification method for an entitlement of a sending entity to send a specific Information Retrieval Request or a consistency check method.

The inventive security method starts with the receipt of an Information Retrieval Request from a Sending Entity. Such an Information Retrieval Request comprises on first hand information about the data which is asked to be retrieved and information of the Mobile Subscriber whose data is retrieved, e.g. his IMSI. Such data which is asked by an Information Retrieval Request can comprise, for example, location information of a mobile subscriber, the usage or the movement of the mobile subscriber, subscriber state information, the IMEI (International Mobile Equipment Identity) of his appliance. Beside this information about the requested data and the Mobile Subscriber, specification information about the Sending Entity is part of the Information Retrieval Request. Therefore, the inventive security method extracts at least one Specification Code from this specification information, which characterizes at least partly the Sending Entity and/or the Mobile Subscriber and/or the retrieved data. In a next step, the extracted at least one Specification Code is compared to a Verification List, which can be in particular stored a LR, e.g. a VLR and/or a SGSN or a respective STP. This comparison with a Verification List leads to a result which gives the security method directly an advice to allow or to prohibit the transmission of the data requested by the Information Retrieval Request.

The Information Retrieval Request comprises also information about the addressed Mobile Subscriber, i.e. it contains information or at least one Mobile Subscriber Specification Code. Such an information in the Information Retrieval Request can be, for example, the International Mobile Subscriber Identity (IMSI), or a piece of the IMSI. The IMSI is used to identify a Mobile Subscriber of a mobile communication network, wherein the IMSI is a unique identification associated with all cellular networks. The IMSI comprises a couple of pieces—a Mobile Country Code (MCC), a Mobile Network Code (MNC) and a Mobile Subscriber Identification Number (MSIN) of Specification Code. Each single piece of Specification Code of the IMSI (MCC, MNC or MSIN) can be extracted alone or in combination and can be used for the step of comparison with the Verification List. The step of comparison can be performed in combination with the at least one Specification Code for specifying the Sending Entity, e.g. the SCCP calling party to the Verification List. This means, the IMSI can be a at least one second piece of Specification Code which is used in combination with the at least one Specification Code that characterizes at least partly the Sending Entity for a comparison with the Verification List.

Therefore, a security method according to the present invention is able to carry out a consistency check. Besides starting a work routine for preparing and transmitting the requested data, the security method is in particular carried out before starting such a work routine. Therefore, the Sending Entity and/or the Mobile Subscriber is checked against the Verification List and therefore consistency and correctness of the Sending Entity is proved. The Verification List can be stored, for example, in a respective VLR, a STP, a serving GPRS support node (SGSN), SGSN/SLR, a Mobile Switching Center Server (MSS, MSC) operated by the network administrator and therefore an adaption or updating process of this Verification List can be of advantage during the use of an inventive security method.

The Verification List can, for example, comprise at least two columns. In the first column, information about different kinds of Specification Codes can be given. In the second column and correlated to the Signal Specification Codes, the prohibition information or allowance information can be stored. It has to be noted that the Verification List can comprise only allowance information, only prohibition information or both, allowance and prohibition information. The different kinds of list sorts of the Verification List can be called positive, negative, or combined lists. Of course a Verification List according to the present information can comprise different sub-lists for handling combinations of different kinds of Specification Codes. In particular, a sub-list for Mobile-Subscriber Specification Codes and a correlated sub-list for Sending Entity Specification Codes can be provided within the Verification List.

Based on the aforesaid information, the security method can be carried out with different situations. In a first situation, a Sending Entity sends an Information Retrieval Request to a LR. The Information Retrieval Request is received by the LR and in a next step a Specification Code specifying the Sending Entity is extracted. Comparing said specification with a verifying Verification List, two different solutions are possible. The first solution is that on a positive list in form of a Verification List, the Specification Code is correlated with an allowance of the transmission of data. Therefore, the Sending Entity is labeled trustworthy and the transmission of data is carried out. A second result of the comparison step can be that there is no correlation between the extracted at least one Specification Code and the Verification List. Therefore, no trustworthy information about the Sending Entity is available for the inventive security method. This could lead directly to the prohibition of transmission of data. A third possible result after the comparison step could be that there is direct information that the Specification Code extracted by the inventive security method is correlated with prohibition information. Therefore, also prohibition of the transmission of data can take place.

A Specification Code in the meaning of the present invention can comprise different kinds of information of the Sending Entity and/or the Mobile Subscriber. For example, a Specification Code can comprise a Country Code, which gives information about the geographical location of the Sending Entity and/or the Mobile Subscriber, e.g. an IMSI indicating the network belonging of a Mobile Subscriber. A Country Code can of course also be of more limited regional structure, for example a Regional Code or a City Code. Moreover a Specification Code can comprise a Network Code. Therefore, the Specification Code with a Network Code gives information about the kind of network in which the Sending Entity has carried out the Information Retrieval Request and which network is the Mobile Subscriber's Home-Network or respectively in which network the Mobile Subscriber is registered with his mobile device. The Specification Code can comprise, for example, a physical machine address of the requesting entity and/or subscriber specific information about the network operator or the service provider in which the Sending Entity has carried out the Information Retrieval Request, IMSI. The Specification Code can comprise information about a specific Mobile Subscriber or a specific server or Sending Entity identification number from which such Information Retrieval Request can be started or triggered. The Specification Code can comprise information of a worldwide unique address of a Signaling System 7 (SS#7) node.

The unique address can be a Global Tittle in an E.164 Format. All E.164 machine addresses can worldwide be routed and uniquely identify the network belonging. The Specification code can comprise the unique physical machine address of the requesting entity, the so-called Signalling Connection Control Part (SCCP) calling party. SCCP and IMSI are applied in different OSI-layers. Of course, an inventive Specification Code is not limited to the examples discussed above.

By an inventive security method, unauthorized Information Retrieval Requests coming from untrustworthy Sending Entities is blocked as to the transmission of the requested data. Without changing anything about the communication protocols between the LR, the HLR or other parts of the Mobile Communication Network, the security of this whole Mobile Communication Network is increased. Therefore, without amending the structure of complex Mobile Communication Networks, an inventive security method can be understood as an add-on module to existing systems. Therefore, without amending the complexity or structure of already existing Mobile Communication Networks, the inventive functionality can be added to such systems.

It can be of an advantage if the inventive security method is characterized in that at least one Specification Code for specifying the Sending Entity and at least one Specification Code for specifying the Mobile Subscriber is extracted, wherein all extracted Specification Codes or combinations of the extracted Specification Code are compared to a Verification List. This can be understood in particular as a combined Verification List, comprising columns and/or lines for the Sending Entity Specification Code as well as for the Mobile Subscriber Specification Code. This combination is able to form a more specific security situation. The combination of information as to the entity requesting information and the entity being the base for such information leads to further security relevant information. A Mobile Subscriber Specification Code can in particular comprise the IMSI (International Mobile Subscriber Information). For example a Sending Entity from the US could be acceptable as to the transmission of data for a Mobile Subscriber also from the US but not for a Mobile Subscriber from any other country.

It is possible that an inventive security method is characterized in that the Information Retrieval Request comprises a so-called Provide Subscriber Information Request (PSI) which requests a transmission of data in form of Subscriber Information (SI) stored in the LR. Data stored in the LR can be separated in particular in more crucial and less crucial data. Information with respect to the mobile subscriber, so-called Subscriber Information, is to be labeled crucial or high security information in that data. To request said data, commonly known Mobile Communication Networks use a PSI. This PSI can be understood as one option of an Information Retrieval Request. In particular, an Information Retrieval Request comprising a PSI for requesting the transmission of data in form of a SI is to be understood as a crucial request. The inventive security method now increases the security that the transmission of such crucial data is only carried out when the Sending Entity is verified as a trustworthy entity. The SI can, for example, be the respective position or a history of position tracking of the mobile subscriber, e.g. the Location Area Identification (LAI) information of a subscriber. Also information as to the mobile phone used by the subscriber or data concerning the service profile of a subscriber, in particular the IMEI number, the International Mobile Subscriber Identity (IMSI), the Mobile Subscriber ISDN Number (MSISDN), the Mobile Station Roaming Number (MSRN), the Temporary Mobile Subscriber Identity (TMSI), traffic data of the subscriber, traffic data and services for billing the subscriber, the Mobile Subscriber class mark can be part of the SI.

Moreover, it is possible that an inventive security method is characterized in that after receiving the Information Retrieval Request the Information Retrieval Request is decoded as to the at least one Specification Code. The security method according to the present invention does not need to understand the full Information Retrieval Request. Therefore, a decoding and/or parsing step can take place to carry out the extraction step. Therefore, also different kinds of Specification Codes can be extracted and decoded and correlated with respective information. The decoding of a Specification Code can, for example, correlate the decoded digits with a Country Code or a Network Code.

It is also possible that according to an inventive security method the Verification List comprises allowed Specification Codes and/or prohibited Specification Codes. These two different possible Verification Lists can be understood as so-called positive or negative Verification Lists. A positive Verification List comprises only allowed Specification Codes. During the comparison step, allowance for the transmission of data is only given in a positive way when the extracted Specification Code is correlated in a positive way with the allowance on the Verification List. Vice versa, a negative Verification List comprises Specification Codes in correlation with prohibiting information as to the respective Specification Code. Therefore, Specification Codes which are on the list lead directly to a prohibition of the transmission of data. For example, also a combination of a positive and a negative Verification List is possible in the meaning of the present invention. Therefore, an active storage of prohibiting information can take place in the Verification List. Also in combination allowance information can be part of the Verification List.

It is further possible that according to an inventive security method the steps of the extraction, the comparison and the allowance/prohibition are carried out before the work routine for handling the Information Retrieval Request is started. A work routine for handling the Information Retrieval Request can, for example, comprise the preparation and the start of the transmission of data. Due to the fact that such work routine needs capacity of the respective server, namely the LR, the positioning of the inventive security method before such work routine is started saves such workload in case of the prohibition of the transmission of data. In particular, an overflow of the respective LR by an overflow of fake Sending Entities is blocked by such an aspect of the present invention.

It is further possible that according to an inventive security method at least two Specification Codes are extracted, in particular all available Specification Codes are extracted. The core of the present invention is already achieved by at least one Specification Code and the respective extraction and comparison steps. To increase security and to decrease the risk of overcoming such security burden, a combination of two or more Specification Codes is used. For example, an extraction can take place for a Specification Code comprising a Network Code as well as for a Specification Code comprising a Country Code. If there are more than these two Specification Codes, in particular all Specification Codes are extracted. These two kinds of Specification Codes can also be labeled as so-called global titles. If more information about the specification of the Sending Entity and/or the Mobile Subscriber is available, this further information can also be decoded and be part of Specification Codes being extracted by the inventive security method. The possibility that a Sending Entity is able to fake its Network Code as well as its Country Code, for example providing a server located in Germany as well as being located in the correct Network in Germany is much harder to achieve than to overcome only one of these bars.

It is further possible that according to the inventive security method in case of prohibition of the transmission of the data requested by the Sending Entity at least one of the following further steps is carried out:

Sending a Prohibition Message to the Sending Entity

Sending a Warning Message to a HLR, in particular comprising the extracted at least one Specification Code.

According to a further embodiment fraudulent requests are archived or logged in a logfile.

These two steps of the non-limited list above are possibilities to spread information about a prohibition act. For example, a Sending Entity which is not a fraud Sending Entity or a fraud HLR (fHLR) is blocked due to lack of information on the Verification List. Therefore, by sending a Prohibition Message to the Sending Entity, this non-fraud Sending Entity receives the information that an update of the List on the respective LR is necessary. This increases the update procedure situation as to all LRs spread over the whole Mobile Communication Network. In case that the Sending Entity is a fraud Sending Entity or fHLR, this information is in particular passed to the correct HLR by a Warning Message. In the follow-up of such a Warning Message, the Verification Lists of all LRs connected to the HLR can be updated with such information. Therefore, the Verification List is able to be updated in particular at least partly automatically by the inventive security method.

It is further possible that according to the inventive security method in case of a prohibition of the transmission of the data requested by the Sending Entity the Verification List is adapted. For example, when the Verification List is a negative Verification List as well as a positive Verification List and the extracted Specification Code is neither part of the positive part of the Verification List nor of the negative part of the Verification List, the transmission of data can be prohibited. The Specification Code being basis for such prohibition is added to the Verification List in the negative part. This can be understood as an automatic updating process for the Verification List. Of course, a transmission of the updated Verification List to the HLR is possible for example as a part of the Warning Message discussed in the aspect above.

Also part of the present invention is a computer program product being stored on a computer readable medium, comprising the following:

Computer readable program means, initiating the computer to receive an Information Retrieval Request from a Sending Entity, Computer readable program means, initiating the computer to extract at least one Specification Code for the Sending Entity and/or a Mobile Subscriber out of the Information Retrieval Request, Computer readable program means, initiating the computer to compare the extracted at least one Specification Code to a Verification List, Computer readable program means, initiating the computer, based on the result of the comparison with the Verification List, to allow or prohibit the transmission of data requested in the Information Retrieval Request.

In particular, the computer program product comprises computer readable program means, initiating the computer to carry out the inventive method. Therefore, the inventive computer program product comes up with the same advantages which have already been discussed in detail with respect to the inventive security method.

A further part of the present invention is a Security Device for the verification of an Information Retrieval Request which requests a transmission of data from a Location Register Server (LR) to a Sending Entity. The inventive Security Device comprises a Receiving Module for receiving an Information Retrieval Request from a Sending Entity. It further comprises an Extraction Module for extracting at least one Specification Code for the Sending Entity and/or a Mobile Subscriber out of the Information Retrieval Request. It further comprises a Comparison Module for comparing the extracted at least one Specification Code to a Verification List. The Comparison Module can be configured to compare a combination of the at least one extracted Specification Code for the Sending Entity and a at least one extracted second Specification Code for a Mobile Subscriber out of the Information Retrieval Request to a Verification List. A Verification Module is comprised for prohibiting or allowing the transmission of the data requested in the Information Retrieval Request based on the result of the comparison. The Security Device in particular comprises a Receiving Module and/or the Extraction Module and/or the Comparison Module and/or the Verification Module in a configuration to carry out the inventive method. Therefore, the inventive Security Device comes up with the same functionality and the same advantages which have been discussed in detail with respect to the inventive method. It is further possible that according to the present invention the Comparison Module or any other part of the Security Device can write a log-file comprising all handled Information Retrieval Requests in particular including the prohibition and/or allowance of the transmission of data.

In particular, an inventive Security Device can be configured to be placed in a LR and/or in a STP in the communication line between the Sending Entity and the LR. Therefore, the inventive functionality of increasing security to block or prohibit the transmission of data can be implemented by a Security Device as a software product as well as a hardware product in the respective server (LR) or the STP.

A further aspect of the present invention is a Mobile Communication Network for communication between mobile stations comprising a Home Location Register Server (HLR) and multiple Location Register Servers (LR). An inventive Mobile Communication Network is characterized in that the VLR and all Signaling Transfer Points (STP) to the LR comprise a Security Device according to the present invention. In particular all STPs and/or all LRs comprise such a respective Security Device. Therefore, an inventive Mobile Communication Network brings up the same functionality and the same advantages discussed in detail with respect to the respective Security Device as well as with respect to the inventive security method.

BRIEF DESCRIPTION OF THE DRAWINGS

The present invention is described in more detail with respect to the accompanying drawings. The drawings show schematically:

FIG. 3 an embodiment of an Information Retrieval Request,

FIG. 4 an embodiment of a combined Verification List, and

DETAILED DESCRIPTION OF SPECIFIC EMBODIMENTS

Figure 1:
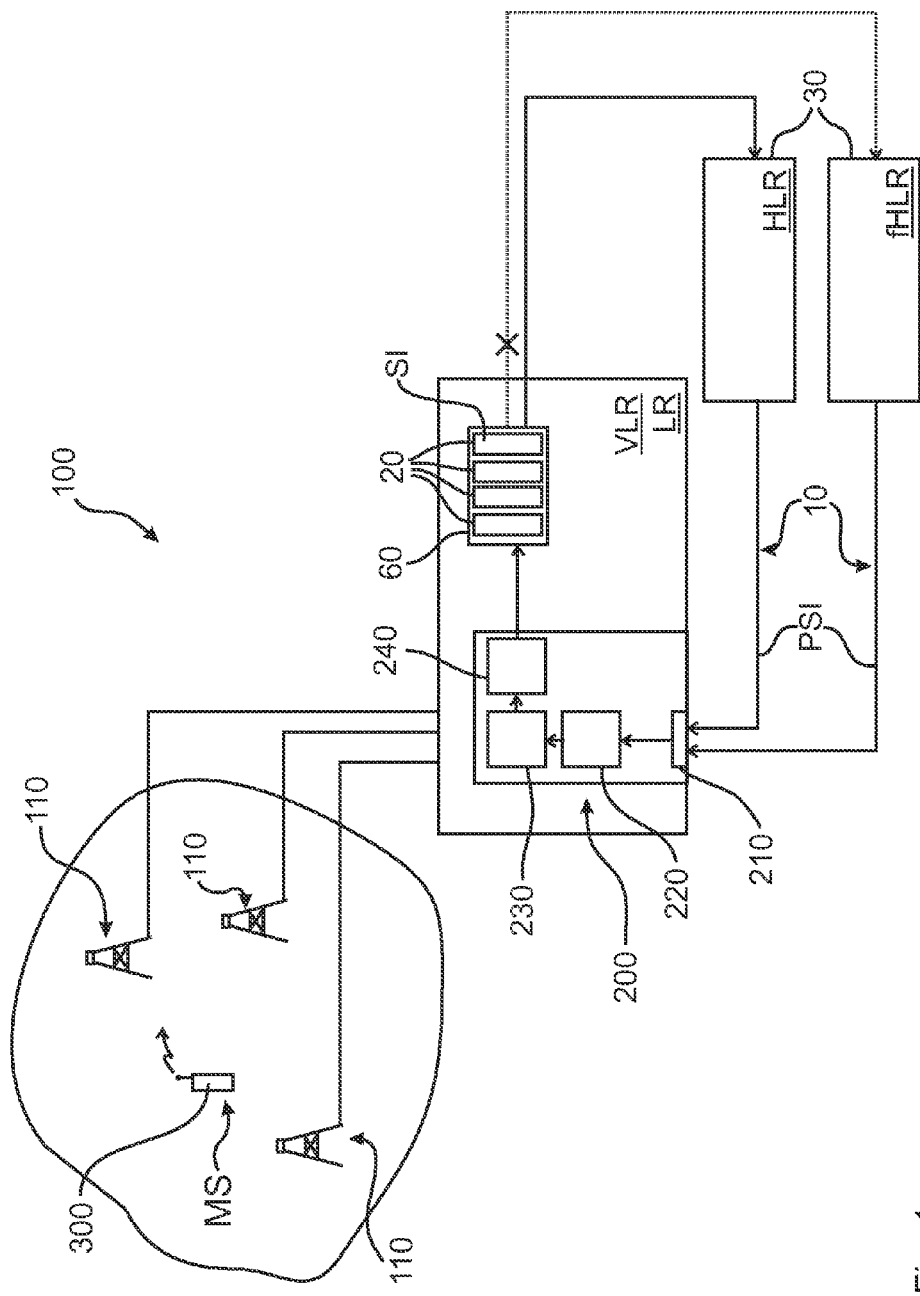
FIG. 1 a first embodiment of the present invention.

FIG. 1 shows a first embodiment of an inventive Mobile Communication Network. The Mobile Communication Network comprises multiple antennas 110 being able to connect wireless with a mobile station 300, for example in form of a mobile telephone. Several antennas 110 are in communication contact with a Location Register Server LR, in this case a Visited Location Register Server VLR, which is configured to be able to coordinate the different antennas 110 in the respective communication.

For regular use, a regular and trustworthy Home Location Register Server (HLR) is able to communicate with the LR/VLR, for example with an Information Retrieval Request 10. The Information Retrieval Request can be configured to comprise a so-called Provide Subscriber Information Request (PSI). When such a PSI Request Message is sent from the HLR to the LR/VLR, it is received by a Receiving Module 210 of an inventive Security Device 200. Furthermore, the received PSI is extracted by an Extraction Module 220 and passed on to a Comparison Module 230 which is able to compare the PSI or the extracted Specification Code of the PSI with the Verification List 14. Based on the results, which in this case due to the trustworthiness of the HLR should lead to an allowance, a Verification Module 240 can allow the transmission of data 20 from the LR/VLR to the trustworthy HLR. Data 20 can comprise Subscriber Information (SI) that is stored in a data storage 60. In this case, the transmission of data 20 is allowed and therefore the HLR receives the requested data. The data 20 may be sent to the HLR as a PSI response. The data sent back to the HLR respectively in this case the PSI response may comprise a Subscriber Information (SI), e.g. a subscriber state and/or location data of a subscriber. In a fraud situation, a Sending Entity 30 in form of a fraud HLR (fHLR) can also send an Information Retrieval Request 10 in form of a PSI or PSI Request Message to the LR/VLR. The PSI, respectively the Information Retrieval Request 10 goes through the same security method in the same Security Device 200, but leads to a result after comparison with the Verification List 14 comprising the prohibition of transmission of data 20. As can be seen in FIG. 1, the transmission of data to the fHLR is blocked by the Security Device 200.

Figure 2:
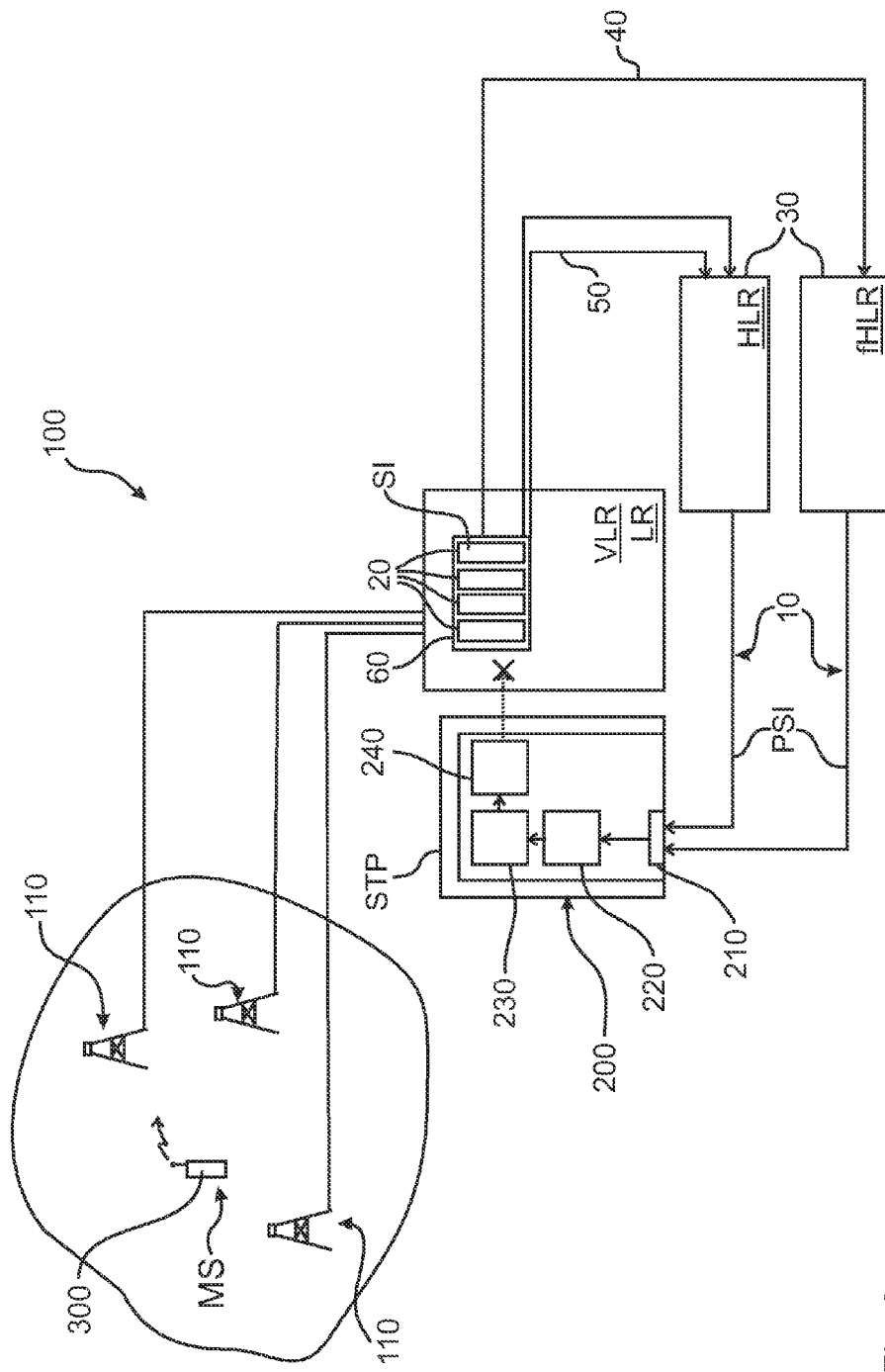
FIG. 2 a second embodiment of the present invention.

FIG. 2 shows a different approach of an inventive Mobile Communication Network 100. In this case, the Security Device 200 is not part of the LR/VLR, but part of a separate Signaling Transfer Point (STP). The functionality of the security method in the Security Device 200 is identical to that discussed as to FIG. 1. In this embodiment, a fraudulent Information Retrieval Request can be blocked already in the STP and is not forwarded to the LR/VLR, as it is schematically shown in FIG. 2.

Moreover, beside the prohibition of the transmission of data 20 to the fHLR in this prohibition case, a Warning Message 50 can be sent to the trustworthy HLR informing about the fraud and misuse try. Moreover, it is possible to send a Prohibition Message 40 to the fHLR to give information about the prohibition of the transmission of data 20. When the fHLR is a trustworthy Sending Entity 30, it can pass on that information for a more detailed verification to the HLR and therefore the Verification List 14 can be updated in the Security Device and in the LR/VLR, respectively.

FIG. 3 shows one possibility of different Specification Codes 12 comprising the Information Retrieval Request. For example, different digits, in particular three digits for a Country Code and two digits for a Network Code, can each form a Specification Code 12. The Specification Codes 12 can specify the Sending Entity 30 and/or the Mobile Subscriber MS for example by using the IMSI for the Mobile Subscriber MS.

FIG. 4 shows a possibility of a combined positive and negative Verification List 14. Different Specification Codes 12 are correlated in the respective lines as to the columns whether YES or NO as to allowance or prohibition of the transmission of data 20.

According to some embodiments a PSI consistency check methodology is applied. Whenever a mobile subscriber attaches into a mobile network, the Location Register stores/maintains/updates the Location information: The Cell-ID (2G)/Service Area ID (3G) of the radio cell, in which the Mobile Station has currently radio contact or in which the Mobile Station was last in radio contact is part of the information. Using a Provide Subscriber Information message (PSI) sensitive data like e.g. location information, subscriber state information and/or IMEI (International Mobile Equipment Identity) can be queried from the Visited Location Register. Hence fraudulent Service suppliers could be able to fetch location information of any customer which can be translated into geographic coordinates, e.g. via Google MAP API. Provide Subscriber Information Messages are usually sent from the Home Location Register towards a Location Register (LR), e.g. the Visited Location Register or the SGSN Location Register. I.e. the requesting node must be part of the subscriber's Home Network whose location information is queried. Any node not belonging to subscriber's Home Network is according to some embodiments of the invention not allowed to receive data upon PSIs querying other networks subscriber's location information unless this is explicitly allowed. Appropriate misuse messages can be blocked, according to embodiments of the invention. PSI/PSLI misuse can be identified, for example, by the following consistency check method: Validate affiliation of IMSI's vs. networks. This means IMSIs can be checked against Calling Global Title in PSI/PSLI request messages. Global Title is an address used in the SCCP protocol for routing signaling messages on telecommunications networks. The Global Title may comprise the above mentioned SCCP calling party, a unique machine address. In mobile networks three types of GT are in use, known as E.164 Format (MSISDN), E.212 Format (IMSI) and E.214 Format (MGT). The E.164 Format (MSISDN) comprises the Country Code (CC), the network code (NDC) and the Subscriber Number (SN). The E.212 Format (IMSI) comprises the Mobile Country Code (MCC), the Mobile Network Code (MNC) and the Mobile Subscription Identification Number (MSIN). The E.214 Format (MGT) is a combination of E.212 and E.164 Format.

According to some embodiments the inventive consistency check can be performed, for example, on the MSC/VLR, MSS/VLR or SGSN/SLR, so that all PSI/PSLI messages are blocked which are not received from the Home-PLMN of the subscriber about which the information is requested. With this solution the consistency check feature can be requested from MSC, MSS/SGSN. The inventive consistency check may be also performed in the STPs at the network border towards national interconnect Partners blocking all PSI/PSLI messages which are not received from the Home-PLMN of the subscriber about which the information is requested. According to some embodiments the inventive PSI consistency check can be based on the following information:

The Provide Subscriber Information contains the IMSI (International Mobile Subscriber Identity) which uniquely identifies the network belonging. The IMSI of the subscriber can be derived from the Application layer of the PSI message. Worldwide unique addresses of SS#7 nodes can be found in the SCCP (Signalling Connection Control Part) layer. The unique addresses are Global Titles in an E.164 format. All E.164 machine addresses can worldwide be routed and uniquely identify the network belonging.

In a STP or alternatively in a MSS/MSC/VLR and/or in a SGSN, SGSN/SLR a comparison is performed correlating, the IMSIs with SCCP Calling Global Titles of PSI request messages. In case the network affiliation of IMSI and SCCP Calling Global Title deviates from each other, the message is blocked, discarded or prohibited.

Figure 5:
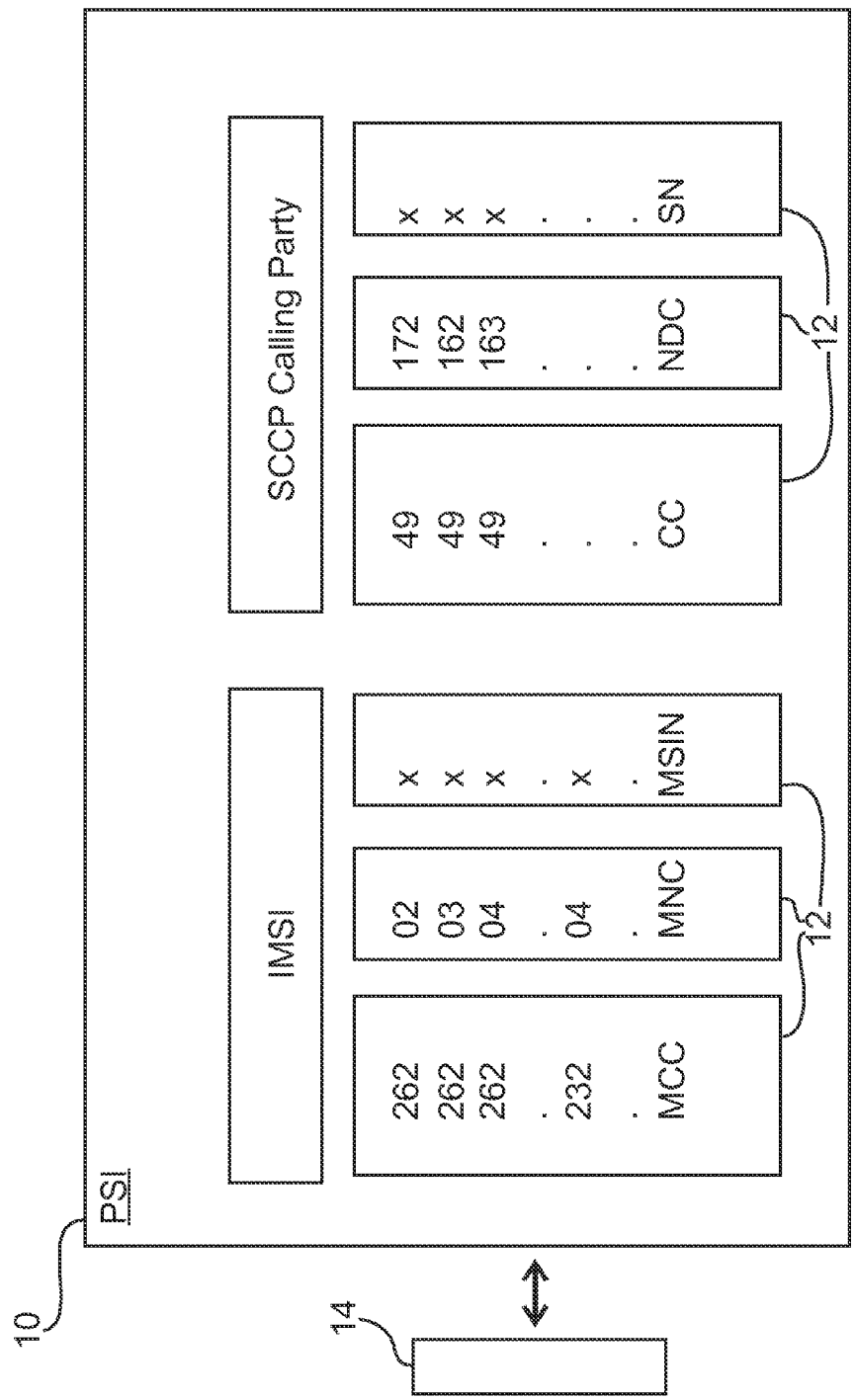
FIG. 5 an embodiment of an Information Retrieval Request.

FIG. 5 shows a more complex structure of an Information Retrieval Request 10 which is here a PSI. Different Specification Codes 12 are part of this PSI. For specifying the Mobile Subscriber MS the IMSI, in particular MCC (mobile country code), MNC (mobile network code) and MSIN are used. For specifying the Sending Entity 30 the SCCP Calling Party, namely CC (country code), NDC (network code) and SN are used. For the verification the comparison of at least one of the Specification Codes 12 against a Verification List 14 is carried in the described manner.

A Specification Code may characterize at least partly the Sending Entity and/or the Mobile Subscriber and/or the retrieved data. In this respect, different combinations of extracted Specification Code which may characterize at least partly the Sending Entity and/or the Mobile Subscriber and/or the retrieved data can be used for the comparison with the Verification List depending on the exact requirements of an Allowance or Prohibition for a transmission of data requested in an Information Retrieval Request.

The discussion and description of the figures above is only carried out by way of examples. Therefore, these examples describe, but do not limit the scope of the present invention.

REFERENCE SIGNS

10 Information Retrieval Request
12 Specification Code
14 Verification List
20 data
30 Sending Entity
40 Prohibition Message
50 Warning Message
60 data storage
100 Mobile Communication Network
110 antenna
200 Security Device
210 Receiving Module
220 Extraction Module
230 Comparison Module
240 Verification Module
300 mobile station
HLR Home Location Register Server
fHLR fraud Home Location Register Server
LR Location Register Server
VLR Visited Location Register Server
PSI Provide Subscriber Information Request
SI Subscriber Information
STP Signaling Transfer Point
MS Mobile Subscriber

What is claimed is:

1. A security method for the verification of an Information Retrieval Request (10) which requests a transmission of data (20) from a Location Register Server (LR) to a Sending Entity (30) in a Mobile Communication Network (100), comprising the following steps:
    receiving an Information Retrieval Request (10) from the Sending Entity (20),
    extracting at least one Specification Code (12) for specifying the Sending Entity (20) and/or a Mobile Subscriber (MS) out of the Information Retrieval Request (10),
    comparing the extracted at least one Specification Code (12) to a Verification List (14),
    based on the result of the comparison with the Verification List (14), allowing or prohibiting the transmission of data (20) requested in the Information Retrieval Request (10).

2. The security method according to claim 1, characterized in that at least one Specification Code (12) for specifying the Sending Entity (30) and at least one Specification Code (12) for specifying the Mobile Subscriber (MS) is extracted, wherein all extracted Specification Codes (12) are compared to a Verification List (14).

3. The security method according to claim 1, characterized in that the Information Retrieval Request (10) comprises a Provide Subscriber Information Request (PSI) which requests a transmission data (20) in form of Subscriber Information (SI) stored in the Visited Location Register Server (VLR).

4. The security method according to claim 2, characterized in that the Information Retrieval Request (10) comprises a Provide Subscriber Information Request (PSI) which requests a transmission data (20) in form of Subscriber Information (SI) stored in the Visited Location Register Server (VLR).

5. The security method according to claim 1, characterized in that after receiving the Information Retrieval Request (10) the Information Retrieval Request (10) is decoded as to the at least one Specification Code (12).

6. The security method according to claim 1, characterized in that the Verification List (14) comprises allowed Specification Codes (12) and/or prohibited Specification Codes (12).

7. The security method according to claim 1, characterized in that the steps of the extracting, the comparing and the allowing/prohibiting are carried out before a work routine for handling the Information Retrieval Request (10) is started.

8. The security method according to claim 1, characterized in that at least two Specification Codes (12) are extracted, in particular all available Specification Codes (12) are extracted.

9. The security method according to claim 1, characterized in that in the case of a prohibition of the transmission of the data (20) requested by the Sending Entity (30) at least one of the following further steps is carried out:
    sending a Prohibition Message (40) to the Sending Entity (30)
    sending a Warning Message (50) to a Home Location Register Server (HLR), in particular comprising the extracted at least one Specification Code (12).

10. The security method according to claim 1, characterized in that in the case of a prohibition of the transmission of the data (20) requested by the Sending Entity (30) the Verification List (14) is adapted.

11. A computer program product being stored on a non-transitory computer readable medium, comprising the following:
    computer readable program means, initiating the computer to receive an Information Retrieval Request (10) from a Sending Entity (30),
    computer readable program means, initiating the computer to extract at least one Specification Code (12) for the Sending Entity (30) and/or a Mobile Subscriber (MS) out of the Information Retrieval Request (10),
    computer readable program means, initiating the computer to compare the extracted at least one Specification Code (12) to a Verification List (14), computer readable program means, initiating the computer, based on the result of the comparison with the Verification List (14), to allow or prohibit the transmission of data (20) requested in the Information Retrieval Request (10).

12. The computer program product according to claim 11 characterized in that it comprises computer readable program means, initiating the computer to carry out the method comprising:

receiving the Information Retrieval Request (10) from the Sending Entity (20);

extracting the at least one Specification Code (12) for specifying the Sending Entity (20) and/or a Mobile Subscriber (MS) out of the Information Retrieval Request (10);

comparing the extracted at least one Specification Code (12) to a Verification List (14);

based on the result of the comparison with the Verification List (14), allowing or prohibiting the transmission of data (20) requested in the Information Retrieval Request (10).

13. A security device (200) for the verification of an Information Retrieval Request (10) which requests a transmission of data (20) from a Location Register Server (LR) to a Sending Entity (30), comprising:

a Receiving Module (210) for receiving an Information Retrieval Request (10) from a Sending Entity (20), an Extraction Module (220) for extracting at least one Specification Code (12) for the Sending Entity (20) and/or a Mobile Subscriber (MS) out of the Information Retrieval Request (10), a Comparison Module (230) for comparing the extracted at least one Specification Code (12) to a Verification List (14) and a Verification Module (240) for prohibiting or allowing the transmission of the data (20) requested in the Information Retrieval Request (10) based on the result of the comparison.

14. The security device (200) according to claim 13, characterized in that the Receiving Module (210) and/or the Extraction Module (220) and/or the Comparison Module (230) and/or the Verification Module (240) are configured to carry out a method comprising:

receiving the Information Retrieval Request (10) from the Sending Entity (20);

extracting the at least one Specification Code (12) for specifying the Sending Entity (20) and/or a Mobile Subscriber (MS) out of the Information Retrieval Request (10);

comparing the extracted at least one Specification Code (12) to a Verification List (14);

based on the result of the comparison with the Verification List (14), allowing or prohibiting the transmission of data (20) requested in the Information Retrieval Request (10).

15. The security device (200) according to claim 13, characterized in that it is configured to be placed in a Location Register Server (LR) and/or in a Signaling Transfer Point (STP) in the communication line between the Sending Entity (20) and the Location Register Server (LR).

16. The security device (200) according to claim 14, characterized in that it is configured to be placed in a Location Register Server (LR) and/or in a Signaling Transfer Point (STP) in the communication line between the Sending Entity (20) and the Location Register Server (LR).

17. A mobile communication network (100) for communication between mobile stations (300) comprising a Home Location Register Server (HLR) and multiple Location Register Servers (LR) characterized in that the Location Register Servers (LR) and/or Signal Transfer Points (STP) to the Location Register Servers (LR) comprise a Security Device (200) comprising:

a Receiving Module (210) for receiving an Information Retrieval Request (10) from a Sending Entity (20), an Extraction Module (220) for extracting at least one Specification Code (12) for the Sending Entity (20) and/or a Mobile Subscriber (MS) out of the Information Retrieval Request (10), a Comparison Module (230) for comparing the extracted at least one Specification Code (12) to a Verification List (14) and a Verification Module (240) for prohibiting or allowing the transmission of the data (20) requested in the Information Retrieval Request (10) based on the result of the comparison.

18. The mobile communication network (100) according to claim 17, the Security Device (200) characterized in that the Receiving Module (210) and/or the Extraction Module (220) and/or the Comparison Module (230) and/or the Verification Module (240) are configured to carry out a method comprising:

receiving the Information Retrieval Request (10) from the Sending Entity (20);

extracting the at least one Specification Code (12) for specifying the Sending Entity (20) and/or a Mobile Subscriber (MS) out of the Information Retrieval Request (10);

comparing the extracted at least one Specification Code (12) to a Verification List (14);

based on the result of the comparison with the Verification List (14), allowing or prohibiting the transmission of data (20) requested in the Information Retrieval Request (10).

19. The mobile communication network (100) according to claim 17, the Security Device (200) characterized in that it is configured to be placed in a Location Register Server (LR) and/or in a Signaling Transfer Point (STP) in the communication line between the Sending Entity (20) and the Location Register Server (LR).

20. The mobile communication network (100) according to claim 18, the Security Device (200) characterized in that it is configured to be placed in a Location Register Server (LR) and/or in a Signaling Transfer Point (STP) in the communication line between the Sending Entity (20) and the Location Register Server (LR).

* * * * *